Figure 1:
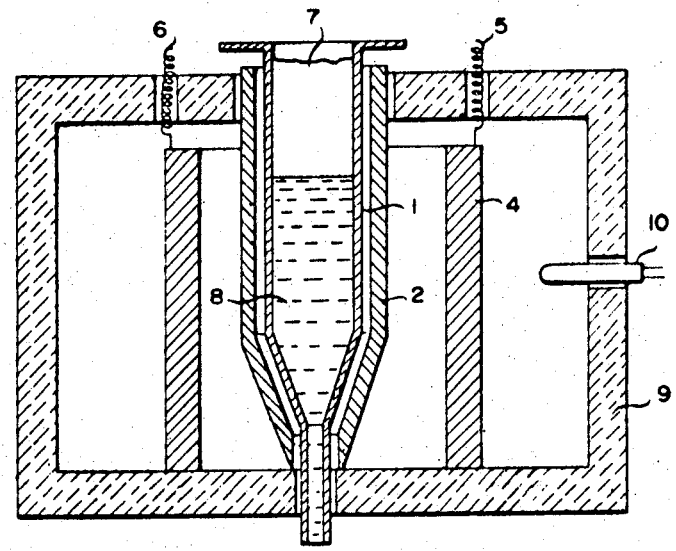

United States Patent [19]

Skurnia et al.

[11] 3,723,603
[45] Mar. 27, 1973

[54] PREPARATION OF FLUOROPHOSPHATES

[75] Inventors: Uwe Skurnia, Wiesbaden-Biebrich; Hans Rohlfs, Heidelberg, both of Germany

[73] Assignee: Chemische Werke Albert, Wiesbaden-Biebrich, Germany

[22] Filed: Sept. 29, 1969

[21] Appl. No.: 861,732

[30] Foreign Application Priority Data

Sept. 28, 1968 Germany..................P 17 92 648.6

[52] U.S. Cl. ....................423/307, 23/310, 13/20, 219/424, 23/277
[51] Int. Cl. .......................C01b 25/00, C01d 11/00
[58] Field of Search..........23/50, 105, 106, 107, 277; 13/20; 219/424

[56] References Cited

UNITED STATES PATENTS

| | | | |
|---|---|---|---|
| 1,328,723 | 1/1920 | Corless | 219/424 |
| 3,440,322 | 4/1969 | Young | 13/20 |
| 3,463,605 | 8/1969 | White et al. | 23/50 |

*Primary Examiner*—Oscar R. Vertiz
*Assistant Examiner*—Gregory A. Heller
*Attorney*—Littlepage, Quaintance, Wray and Aisenberg

[57] ABSTRACT

A process for the continuous production of an alkali metal fluorophosphate from a mixture containing an anhydrous alkali metal fluoride and at least one phosphate and feeding it to a heated reactor vessel provided with means for continuous discharge of a molten product, and in the reactor vessel being a molten bed overlaid with starting materials, wherein the reactor vessel is provided with a) a melting tube surrounded by a protection tube, and )b an electrical heating element for heating said protection tube, and the distance between the protection tube and the melting tube is at least 5 and at most 300 mm and not more than 60 percent of the radius of the melting tube and an apparatus for carrying out this process.

8 Claims, 2 Drawing Figures

PREPARATION OF FLUOROPHOSPHATES

The invention concerns the preparation of fluorophosphates.

In our U.S. Pat. application Ser. No. 717,430, now abandoned, is described a process for the continuous production of an alkali metal fluorophosphate which comprises making a mixture containing an anhydrous alkali metal fluoride and an alkali metal-, meta- pyro- or poly- phosphate or a phosphate yielding an alkali metal meta- or poly- phosphate an heating, and feeding it to a heated reactor vessel provided with means for the continuous discharge of a molten product, in such a way that there is maintained in the reactor vessel a molten bed overlaid with starting materials. The mixture optionally includes $P_2O_5$ or an alkali metal salt for adjusting the molar ratio in the melt of $X_2O : P_2O_5 : F$ to a preferred ratio of 2 : 1 : 2, X being an alkali metal. The reactor vessel may be made of graphite, silver, iron or preferably platinum.

If this process were performed in a gas-heated oven, due to the necessarily non-uniform temperature it would be necessary to protect the (e.g. platinum) crucible from uneven heating. Gas heating would prove particularly disadvantageous if reactor vessels of other metals such as silver, iron or graphite, which are considerably cheaper than platinum, were used; a very accurate temperature regulation of the furnace would then be necessary. Thus, e.g. when using silver a temperature of 850°C must not be exceeded at any point on the melting tube because silver melts at 960°C and mechanical stresses occuring just below this temperature, such as could for example be caused by the pressure of the salt melt from the inside, would naturally not be withstood permanently.

It is an object of the invention to provide an improvement on the above process using apparatus having an electrical heating means which makes possible a uniform transfer of the requisite high heat input to the starting material located in the reactor vessel; due to the uniform heating the reactor vessel is lightly stressed so that its strength is maintained over a long period.

According to the invention there is provided a process for the continuous production of an alkali metal fluorophosphate as claimed in application Ser. No. 717,430 wherein the process is effected in a reactor vessel which comprises a melting tube surrounded by a protection tube, and an electrical heating element for heating said protection tube, and the distance between the protection tube and the melting tube is at least 5 and at most 300 mm and is not more than 60 percent of the radius of the melting tube. An essential feature of the invention is the use of a reactor vessel in the form of a melting tube in which the starting materials are continuously melted. The other design features of the apparatus used depend among other things on the material from which the melting tube is made.

According to another aspect of the invention there is provided apparatus for carrying out the above process comprising a melting tube surrounded by a protection tube, and electrical means for heating said protection tube, the distance between the protection tube and the melting tube being from 5–300 mm and not being more than 60 percent of the radius of the melting tube.

Any suitable material may be used for the melting tube, but graphite, silver, iron or platinum are preferred.

Preferably the distance of the protection tube from the outer wall of the melting tube within the given minimum or maximum distances is between 10 and 40 percent of the radius of the melting tube.

According to a preferred embodiment the protection tube is in the form of a protective hollow e.g. cylindrical vessel, the lower end of which has an opening through which is passed the outlet of the melting tube for the fluid fluorophosphate. According to a further preferred feature the electrical heating element and the protection tube can be combined in such a way that the protection tube is itself provided with an electrical heating coil or filament winding and therefore serves at the same time to support this electrical heating element.

Figure 2:
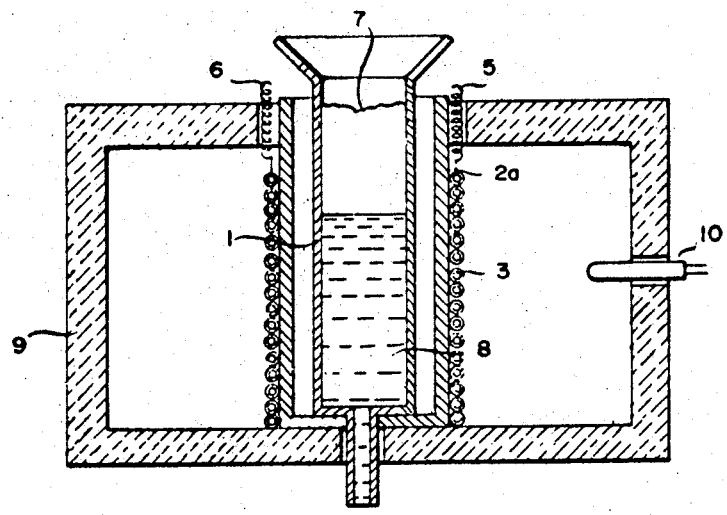

Two embodiments of apparatus suitable for carrying out the process according to the invention as shown in cross-section in FIGS. 1 and 2 of the accompanying drawings.

In these drawings 1 is the melting tube with an outlet located at its lower end, 2 the protection tube, 2a the protection tube surrounded by a heating coil 3, 4 a cylindrical heating element, 5 and 6 the electrical connections, 7 the pulverulent starting mixture, 8 the melt, 9 the housing constructed of e.g. firebricks and 10 a thermocouple for measuring the furnace temperature.

The process may be carried out in apparatus including funnel means the upper part of which can be in the shape of the upper part of the melting tube, e.g. as shown in FIGS. 1 and 2 of the accompanying drawings. By means of such funnel means which can for example be located on the rim of the melting tube or suspended over the rim of the melting tube, the pulverulent starting material can more easily be introduced into the melting tube. The outlet from the melting tube is naturally narrower than the melting tube diameter. It can taper conically and/or lead downwardly as a narrower tube from the melting tube as already described in the said patent. With graphite melting tubes the outlet is preferably of silver or iron.

The protection tube is preferably made of a material which is chemically and mechanically resistant to the working conditions e.g. from sintered ceramic such as sintered aluminum oxide or from steel. The electrical heating element is preferably cylindrically shaped and is preferably formed from a semi-conductor such as silicon carbide. It can also, however, consist of a winding of heating wires of a known material which when placed on an electrically conductive protection tube is naturally insulated therefrom to prevent a short circuit.

Naturally in selecting the materials for the melting tube and protection tube the chemical and mechanical characteristics of these materials must also be taken into consideration. For example, when working with a platinum melting tube it is not advisable to use a steel protection tube. If for example a steel tube is used as the carrier for the electric heating element and at the same time a platinum melting tube is used, it is preferable to use a protection tube of a substance which prevents the diffusion of metal atoms into the platinum which occurs to a certain extent at the high temperatures used. This protection tube can then naturally be very thin. If on the other hand a silver melting tube is surrounded by a steel protection tube no difficulties are to be expected.

The protection tube has various functions. It must prevent the destruction of the heating elements by the hot melt, if as a result of an accident the melting tube is destroyed and the melt runs out. It must also damp out irregularities in the radiant heat irradiated by the heating elements by itself absorbing this radiant heat, and via an air cushion transmitting it to the melting tube. The protection tube can also have the task of shielding e.g. a graphite melting tube from the atmosphere e.g. by filling the space between the graphite tube and the protection tube with an inert gas or, if this is not considered desirable, dimensioning the protection tube very closely around the graphite tube. In this special case it is also possible to have a smaller distance between the protection tube and melting tube than 5 mm.

The given distance between the protection tube and the melting tube should be adhered to because if a leak occurs e.g. due to a hairline crack, initially melt slowly exudes from the melting tube and flows down its exterior. If the distance between the melting tube and protection tube is too small contact can take place between the melting and protection tubes resulting in the rapid bursting of the protection tube if it is made of non-metallic materials or disintegration when it is made from metals such as steel. It is also advisable to maintain a minimum distance between protection tube and melting tube because over a period of time protection tubes made of metal, especially platinum, suffer deformations such as swelling. As from time to time the degree of corrosion on the melting tube must be checked and to this end the melting tube must be removed from the protection tube it must not be jammed into the protection tube.

The space between protection tube and melting tube need not necessarily be filled with a gaseous medium but can also be filled with solid substances such as annealed $Al_2O_3$ powder. It is naturally also possible to combine a number of these features: for example a heating element can be placed round a steel protection tube and into this a silver-clad graphite melting tube can be inserted. As hereinbefore stated a funnel e.g. made of iron or silver can be inserted into a graphite tube, said funnel being immersed in the melt and preferably engaging tightly with the graphite tube, so that contact of the inner wall of the graphite tube with the air and therefore its destruction is prevented or reduced.

The whole unit consisting of melting tube, protection tube and heating element is advantageously externally shielded e.g. with firebricks, so that only the inlet and the outlet of the melting tube are in contact with the atmosphere. The outflowing molten product is for example collected in a tank in which it solidifies on cooling. It can also, however, be continuously led off, solidified and then comminuted.

The temperature of the furnace, which depending on the working conditions can be set to 800° to 1600°C, preferably 1000° to 1300°C, is advantageously continuously measured with a thermocouple. Surprisingly enough in spite of the melting point of the silver being 960°C it is possible to work at furnace temperatures above 1000°C, provided that the silver tube is always filled with melt and starting material, whereby the large amounts of heat can always be absorbed. In this way a fusion of the silver melting tube is prevented.

The dimensions of the protection tube and the discharge tube are advantageously chosen so that the residence time of the melt in the tube is adequate to ensure a substantially quantitative reaction without decomposition or splitting off of hydrofluoric acid occuring.

Obviously the metering of the starting materials must be correspondingly adjusted but this causes no difficulties.

The process and apparatus according to the present invention not only offers the advantage of continuously providing a product of definite composition which has a high degree of purity; the invention also provides the possibility of checking the inner and outer walls of the melting tube in a very simple manner and also, if necessary, cleaning the tube. To this end the melting tube is allowed to become empty, removed after cooling, any adhering residue of solidified melt is removed and the tube condition checked. Cleaning is for example possible with sodium hydrogen sulphate. After a simple assembly operation has been completed working can immediately be continued.

In order that the invention may be better understood, the following example is given by way of illustration only.

Example

Every hour 5 to 6 kg. of a mixture of sodium trimetaphosphate and sodium fluoride, in molar ratios of 1:3 which have been carefully mixed in a Lodige mixer are steadily added to the melting tube 1 of the apparatus shown in FIG. 1. The system consisting of the protection tube and the melting tube of platinum is all round surrounded by a cylindrical electrical semiconductor heating element (silicon carbide). Heating of the system is so controlled that in the platinum tube a molten bed with a temperature of approximately 650°C is formed. Above this is a layer of sintered material and above this again a layer of powdery material which prevents air entering the lower inside part of the melting tube. Obviously there are no clearly defined limits between the sintered layer and the still unchanged layer in the melting tube.

Through the melting tube, and out of the discharge opening at the lower end, flow about 5 to 6 kg of molten product every hour, which solidifies on cooling and is then pulverized. The yield is practically 100 percent, based on the starting materials used.

The following are mean analytical values for the end product:

$P_2O_5 = 59\%$
$Na_2O = 42-43\%$
$F = 12-13\%$

These are in good agreement with the theoretical values.

At least 95 percent of the total $P_2O_5$ is monofluoroorthophosphate. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. In the process for the continuous production of an alkali metal fluorophosphate from a mixture containing an anhydrous alkali metal fluoride and at least one phosphate selected from the group consisting of alkali metal metaphosphates, alkali metal pyrophosphates, alkali metal polyphosphates and alkali metal phosphates yielding at least one of the alkali metal meta- and polyphosphates on heating, by feeding the mixture to a heated reaction zone provided with means for the continuous discharge of a molten product, in such a way that there is maintained in the reaction zone a molten bed overlaid with starting materials, the improvement which comprises:

effecting the process in a centrally located elongated downwardly extending cylindrical melting and reaction zone, surrounding said cylindrical zone with a cylindrical protection zone, externally electrically heating said protection zone to maintain a temperature between 800° and 1600°C. therein, maintaining the distance between the exterior of the protection zone and the melting and reacting zone between at least 5 and at the most 300 mm and not more than 60 percent of the radius of the melting and reacting zone, flowing pulverent mixture into an upper end of the melting zone, melting the mixture and reacting the mixture in melting said centrally located zone, and continuously downwardly flowing alkali metal fluorophosphate from a lower end of said centrally located zone.

2. A process according to claim 1, wherein the distance of the cylindrical protection zone from the outside of the melting zone is between 10 and 40 percent of the radius within said minimum and maximum distances.

3. A process according to claim 1, wherein the melting zone has a discharge zone of reduced diameter.

4. A modification of the process according to claim 1, wherein the melting zone is surrounded by graphite and the distance of the melting zone from the protection zone is less than 5 mm.

5. A process according to claim 1, wherein the unit comprising said melting and reacting zone, protection zone and heating element is surrounded by a further protection zone in such a manner that only inlet and outlet means of said melting and reacting zone are exposed to contact with the atmosphere.

6. A process according to claim 1 wherein the space between the protection zone and melting zone is occupied by powdered alumina.

7. The process of claim 1 further comprising vertically orienting the cylindrical melting and reacting zone and the cylindrical protection zone and concentrically surrounding said zones with a further cylindrical protection zone.

8. The process of claim 1 wherein the heating step comprises surrounding the protection zone with a cylindrical heating means.

* * * * *